(12) United States Patent
Vaishnavi et al.

(10) Patent No.: US 10,819,659 B2
(45) Date of Patent: Oct. 27, 2020

(54) DIRECT REPLYING ACTIONS IN SDN SWITCHES

(71) Applicant: Huawei Technologies Co., Ltd., Shenzhen, Guangdong (CN)

(72) Inventors: Ishan Vaishnavi, Munich (DE); Artur Hecker, Munich (DE); Riccardo Guerzoni, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 65 days.

(21) Appl. No.: 15/957,772

(22) Filed: Apr. 19, 2018

(65) Prior Publication Data

US 2018/0241695 A1 Aug. 23, 2018

Related U.S. Application Data

(63) Continuation of application No. PCT/EP2015/074254, filed on Oct. 20, 2015.

(51) Int. Cl.
*H04L 12/947* (2013.01)
*H04L 12/24* (2006.01)
*H04L 12/935* (2013.01)

(52) U.S. Cl.
CPC .......... *H04L 49/25* (2013.01); *H04L 41/0893* (2013.01); *H04L 41/20* (2013.01); *H04L 49/30* (2013.01); *H04L 41/083* (2013.01)

(58) Field of Classification Search
None
See application file for complete search history.

(56) References Cited

U.S. PATENT DOCUMENTS

| 8,904,506 B1* | 12/2014 | Canavor ................. H04L 29/06 726/7 |
| 9,071,529 B2* | 6/2015 | Garg ....................... H04L 47/12 |
| 2011/0286324 A1 | 11/2011 | Bellagamba et al. |
| 2013/0163426 A1 | 6/2013 | Beliveau et al. |

(Continued)

FOREIGN PATENT DOCUMENTS

| CN | 103561011 A | 2/2014 |
| CN | 103731370 A | 4/2014 |

(Continued)

OTHER PUBLICATIONS

"OpenFlow Switch Specification,Version 1.5.0 (Protocol version 0x06)"; Open Networking Foundation; Dec. 19, 2014; 277 pages.

(Continued)

*Primary Examiner* — Jamal Javaid
(74) *Attorney, Agent, or Firm* — Conley Rose, P.C.

(57) ABSTRACT

A forwarding device for a SDN system is provided. The forwarding device is configured to determine a response rule match for received data packets and for generating a response packet according to the response rule and comprises a storage module and a response packet generating module. The storage module is configured to store at least one response rule and the response packet generating module is configured to generate a response packet according to the response rule in case of a response rule match, wherein the response packet generating module is configured to generate the response packet based on information which is identified in the response rule.

18 Claims, 9 Drawing Sheets

(56) References Cited

U.S. PATENT DOCUMENTS

| | | |
|---|---|---|
| 2013/0250770 A1 | 9/2013 | Zou et al. |
| 2014/0098669 A1 | 4/2014 | Garg et al. |
| 2014/0112130 A1* | 4/2014 | Yang .................. H04L 49/25 370/230 |
| 2014/0334489 A1 | 11/2014 | Bosshart et al. |
| 2017/0005943 A1* | 1/2017 | Raj .................... H04L 45/38 |
| 2017/0063696 A1* | 3/2017 | Viquez ................ H04L 47/24 |
| 2017/0070416 A1* | 3/2017 | Narayanan ........... H04L 45/02 |
| 2017/0223039 A1* | 8/2017 | Mont ................ H04L 63/1425 |
| 2018/0167337 A1* | 6/2018 | Keaveny ............. H04L 49/35 |

FOREIGN PATENT DOCUMENTS

| | | |
|---|---|---|
| CN | 103825823 A | 5/2014 |
| CN | 104468343 A | 3/2015 |
| CN | 104767762 A | 7/2015 |
| WO | 2016188548 A1 | 12/2016 |
| WO | 2017036505 A1 | 3/2017 |

OTHER PUBLICATIONS

"SDN architecture—Issue 1"; Open Networking Foundation; ONF TR-502; Jun. 2014; 68 pages.

Machine Translation and Abstract of Chinese Publication No. CN103825823, May 28, 2014, 12 pages.

Machine Translation and Abstract of Chinese Publication No. CN104468343, Mar. 25, 2015, 24 pages.

Machine Translation and Abstract of Chinese Publication No. CN104767762, Jul. 8, 2015, 15 pages.

Foreign Communication From a Counterpart Application, Chinese Application No. 201580080485.2, Chinese Office Action dated Jun. 3, 2019, 11 pages.

* cited by examiner

DIRECT REPLYING ACTIONS IN SDN SWITCHES

CROSS-REFERENCE TO RELATED APPLICATIONS

This application is a continuation of International Application No. PCT/EP2015/074254, filed on Oct. 20, 2015, the disclosure of which is hereby incorporated by reference in its entirety.

TECHNICAL FIELD

The present application relates to the technical field of data transmission networks, in particular to components used in software defined networks (SDNs) disclosure.

BACKGROUND

Software defined networking (SDN) is an approach that basically relates to decoupling the management and controlling tasks from data packet forwarding tasks. The management and controlling tasks are usually referred to as control plane whereas the forwarding tasks are referred to as data plane. This decoupling can simplify the structure of a network and can standardize interfaces between individual components and between the control and data plane. Usually, the data plane is configured such that it necessarily requires control commands from the control plane in order to meet the forwarding tasks. Simply speaking, the "intelligence" of an SDN system is provided in the control plane whereas the data plane simply carries out commands and instructions received from the control plane. One mechanism which relates to and defines the communication between the control plane and the data plane is OpenFlow. It should be understood that any reference to OpenFlow in the following generally relates to any mechanisms and interfaces which define the communication between the control plane and the data plane in SDN. Reference to OpenFlow is made representative for any of these mechanisms and interfaces.

A typical SDN network is composed of simple switches (or forwarding elements) in the forwarding plane and an intelligent SDN controller that configures how those switches behave by installing flow (or forwarding) rules on the switches. In the simplest view, the flow rules can be thought of as match-action pairs. The context information (such as the incoming switch port), header and/or other parts of an incoming data flow, frame, packet, datagram or segment (in the following called packet for simplicity) may be matched to the contents of the flow table of the switch, and, in case of a match, the switch may trigger actions, such as forwarding to a certain port, dropping the packet altogether, redirecting the packet to the controller and so on. In case an incoming packet does not match any of the flow rules defined on the switch then the switch can send what is called a PACKET_IN consisting of the incoming packet as well as some switch context information (such as incoming port) to the controller. The controller may analyse this PACKET_IN (or an application on top of the controller) and, which consequently typically will result in either i) installation of new flow rules on some switches (e.g., to handle future packets somehow corresponding to the initial one) and/or ii) sending out of some packets (e.g., relaying the originally received one). The controller is a logical entity that gathers and keeps an up-to-date per-flow network state. However, such a centralization introduces obvious scalability issues.

Therefore, various mechanisms are needed to offload the controller from tedious, repetitive tasks that can better be handled by switches. While adding functions to the switches, the trick is not to break the fundamental SDN model assumption which requires that the intelligence of the SDN is hosted by the controller whereas the switch is a simple executive entity which follows the rules provided by the controller.

The Open Networking Foundation technical reference 502 "Architectural specifications of software defined networking" states that "the controller may configure the data plane to respond autonomously to events such as network failures or to support functions delivered by, for example, LLDP, STP, BFD". This would include responding to the signaling in the data plane which may be static in nature.

The link service module of link layer discovery protocol (LLDP) in the SDN controller typically instructs switches to send LLDP messages out of all ports that are connected as soon as the service is started. In this case the messages generated by the switches are directly determined by the reception of the original LLDP message from the SDN controller. OpenFlow switches implementing STP try to ensure a loop-free topology for any bridged Ethernet local area network. While switches can send autonomous messages when implementing STP, it is more of a protocol orthogonal to the scope of controller switch operation. Similarly bidirectional forwarding detection (BFD) is a protocol used to detect link failures by sending link failure detection packets. In the event of a link failure, traffic is redirected from the failed link to a backup link by altering entries on a flow table of the OpenFlow switch. Thus, the action taken by the switch does not concern the generation of packets but only a re-configuration of the forwarding tables. However, such autonomous behavior on part of the switch is protocol-based and is as such outside the purview of the SDN control infrastructure. It is in fact to complement the organization of the network.

Reference CN103731370A describes caching in switches, when network reconfigurations are taking place to avoid data loss. When the switch becomes aware of significant reconfigurations in the network, when indicated by the controller, the switch establishes a flow buffer to save the packets received for that flow and waits until the flow table reconfiguration is finished as indicated by the controller.

Reference CN103561011A refers to a particular controller application for attack detection as well as the corresponding controller-switch interaction that can configure switch process (reject) incoming packets from a possible DDOS attack. The system described therein comprises an SDN controller resource pool monitor which creates a dynamic list of controllers which the switch can forward a flow to. Each of those controllers runs an attack detection application module which may extract flow specific information if an attack is detected and install flow rules to prevent the attack on the switch.

The OpenFlow specification version 1.5 of the Open Networking Forum defines an optional action called copy-field. This action copies the content of one field to another field and is restricted to certain fields in the matching packet header.

SUMMARY

It may be seen that one object of the disclosure is to reduce the load of the control plane in an SDN system.

This object is achieved by the features of the independent claim. Further implementation forms are apparent from the dependent claims, the description and the figures.

According to an aspect of the disclosure, a forwarding unit for a software defined networking (SDN) system is provided. The forwarding unit is configured to determine a response rule match for received data packets and for generating a response packet according to the response rule, wherein the forwarding unit comprises a storage module and a response packet generating module. The storage module is configured to store at least one response rule and the response packet generating module is configured to generate a response packet according to the response rule in case of a response rule match, wherein the response packet generating module is configured to generate the response packet based on information which is identified in the response rule.

In other words, the response rule defines how to generate a response packet by the forwarding unit. Thus, load of the control plane is reduced as the switch can generate response packets to standardized requests, for example the address of a printer in the network. If the switch identifies such a request, it can generate a response packet containing the address of the printer, wherein the response packet is generated according to a respective response rule.

The response packet can be broadcast to any recipient in the network or it can be sent to a specific client, for example the requesting client or a client indicated in the requesting message.

A response rule is basically the same as a forwarding rule. Where the forwarding rule defines the next hop of a packet in the network, the response rule defines a rule for generating a packet, i.e., the response packet. Both, the forwarding rule and the response rule contain a matching part (which criteria does an incoming packet have to meet in order to match the rule, this can be referred to as "response rule match") and an action part (what action has to be performed by the forwarding unit). In other words, the difference between a forwarding rule and a response rule is the type of action: the forwarding rule defines the next destination of a matching packet and the response rule defines how to create the response packet in case of a response rule match.

The forwarding unit is particularly configured to determine a forwarding rule match for received data packets and for forwarding the received data packets according to the forwarding rule match. This is the basic function of the forwarding unit.

A forwarding rule match occurs when a data packet meets the conditions of a forwarding rule (a forwarding rule can comprise one or more conditions and one condition can refer to any one or more than one parameters of the following non exhaustive list: data packet source, target, content, application data, protocol). A condition of the forwarding rule may be referred to as a match field. In case of a match, the respective data packet is forwarded via a specific port of the forwarding unit to the next hop (next network element) on its way to the target.

The same basic functioning applies to the response rule. A response rule comprises at least one but possibly more than one or multiple conditions and instructions for generating a response packet if the condition(s) are met. A response rule match occurs when a data packet meets the at least one condition of a response rule, similar to the forwarding rule match. The generated response packet can be a unicast response to the source of the data packet which matches the response rule or it can be a broadcast or a response packet to any predefined target in the SDN system.

The storage module can be any component which is configured to store information or content, e.g., a persistent or non-persistent storage element, a database, etc. Generally speaking, the storage module can be any memory unit.

The forwarding unit as described above and hereinafter can generate response packets as a result of a response rule match. Thus, the forwarding unit can act as a simple active component in the SDN and can carry out some actions autonomously without the need of consulting a control unit in the SDN. Thus, the load of the SDN, particularly the load of the control plane or the communication between the data plane and the control plane, can be reduced since the communication and the amount of data exchange between the forwarding unit and the control unit is reduced since the forwarding unit is configured to autonomously generate reply messages according to response rules which are provided by a control unit to the forwarding unit.

According to an embodiment of the disclosure, the response rule identifies a location in the storage module, which location contains the information for generating the response packet and the response packet generating module is configured to read the information from said location.

A location of the storage module can be a physical or logical section of the storage module, for example a cell of a memory unit, wherein the cell can be identified by an address. The response rule contains said address and the content of the respective location is taken and is used for generating the response packet, for example by copying said content to a field of the response packet.

The response rule can comprise one or more pointers to specific locations in the storage module, wherein the pointers give access to the values of parameters to be used for generating the response packet.

In other words, the action-section of a response rule may be the following: take content from address a of the storage module and insert that content in field f of the response packet. The response rule can contain multiple such instructions.

The forwarding unit can be configured to receive configuration information before a response rule is activated. That configuration information may contain the content which is required for generating the response packet. In other words, a control unit first sends the content and instructions which are stored in the storage module (the instructions may also define at what address to store which content) and afterwards, response rules are generated by the control units required for generating the response packets on the previously sent content and instructions.

According to a further embodiment of the disclosure, the response packet generating module is configured to generate the response packet according to a predefined response packet template.

The response packet template describes the general structure of the response packet. Unchanging and static fields of the response packet can be defined directly in the response packet template, whereas only the dynamic fields have to be created based on content from the storage module.

Thus, the time, effort and expenses of the process for generating the response packet can be reduced.

According to a further embodiment of the disclosure, the response packet template comprises at least one static field and at least one dynamic field, wherein the dynamic field is generated based on content of a storage cell identified in the response rule.

The response rule comprises pointers to the storage module and the number of pointers to the storage module can be reduced since a pointer is only required for dynamically changing fields of the response packet.

For example, the response packet may comprise ten fields, wherein five of these ten fields can have a predefined content according to the response packet template; thus, only the remaining five empty fields must be generated based on content of storage cells to which pointers of the response rule point; in this case, the number of pointers is maximum five or can be less of the content of two subsequent fields of the template is stored in a single storage cell.

According to a further embodiment of the disclosure, the forwarding unit as described herein comprises two ports, wherein the forwarding unit is configured to transmit the generated response packet via one port of the two ports according to the response rule, wherein the forwarding unit is configured to transmit the response packet via that port at which the data packet that matches the response rule is received.

The two ports can be incoming and outgoing ports which are connected to another network node. By identifying the port which is to be used for transmitting the response packet the target and/or the route of the response packet through the SDN can be affected. The response packet can be sent to the requesting entity or it can be sent to a group of entities or any other specific third entity, for example to inform the third entity about incoming of a specific data packet at the forwarding unit. When referring to an entity or a client, this relates to a device which is connected to the SDN.

When transmitting the response packet via that port at which the data packet that matches the response is received, the response packet is transmitted as a direct response to the requesting entity. In other words, the data packet matching a response rule can be considered a request wherein the forwarding unit generates and sends a response to that request.

According to a further embodiment of the disclosure, the response packet generating module is configured to generate the response packet based on fields of the data packet that matches the response rule, wherein the fields are identified in the response rule.

The data packet matching the response rule is the data packet incoming at the forwarding unit, wherein said data packet meets the conditions of a response rule. For generating the response packet, the content of one or more fields of the incoming packet can be used, for example the source address field of the incoming packet in order to use this address as the target address of the response packet (in case the response packet is sent to the requesting entity). In this embodiment, the response rule contains at least the instruction: take the source address of the incoming data packet and copy the content of this field to the target-field in the header of the response packet.

The forwarding unit described herein can save and/or fetch specific memory string to/from a storage area to construct a packet template to be sent in response to a match as specified by the controller in step. The packet (response packet) is typically to be sent to the sending node of the original packet that matched. However it may also be sent to any other node in the network, as well as to special destinations such as broadcast, multicast, and other destinations. The forwarding unit can replace parts of the constructed packet template with other strings that may come from data sources such as (but not limited to) a specific replacement database intended solely for this purpose, a system memory of the forwarding unit, the packet that matched and its context information such as metadata, the controller information, metering or performance values of the forwarding unit. The forwarding unit can construct proper headers as and if required by the network the forwarding unit is operational to send out the response packet to the appropriate output port.

According to a further aspect of the disclosure, a control unit for a software defined networking (SDN) system is provided, wherein the control unit is configured to configure at least one forwarding unit of the SDN system.

Specifically, the control unit described herein configures the forwarding unit described above such that the forwarding unit can meet its function. Simply speaking, the intelligence is still located in the control unit, as the control unit configures the forwarding unit. It is one aspect of the control unit and the forwarding unit described herein that they cooperate such that the control unit delegates simple functions to the forwarding unit by configuring the forwarding unit such that it is able to carry out these functions, namely by generating response packets in case of a scenario which is defined in advance.

The control unit comprises a configuration module for generating a configuration command for a forwarding unit, wherein the configuration command comprises a response rule with a matching condition of an incoming data packet at the forwarding unit, at least one parameter value to be stored in a storage module of the forwarding unit, wherein the configuration command is configured to instruct the forwarding unit to generate a response packet if an incoming data packet matches the response rule, wherein the response packet is to be generated based on the at least one parameter value.

Thus, the control unit delegates simple tasks to the forwarding unit and the load of the control unit is reduced. The forwarding unit works according to the instructions received with the configuration command. In other words, the configuration command instructs the forwarding unit to generate the response packet in case of a rule match.

According to a further embodiment of the disclosure, the configuration command comprises a location in the storage module for storing the at least one parameter value, wherein the response packet generating command identifies the location such that the response packet is generated based on the location of the at least one parameter value in the storage module.

In other words, the control unit defines at which storage location to store a parameter value in order for the forwarding unit to access said storage location in accordance with the response rule when generating the response packet.

According to a further embodiment of the disclosure, the configuration module is configured to generate the configuration command such that it comprises a pointer to a field of the incoming data packet that matches the response rule, wherein the response packet is to be generated based on the parameter stored in the pointed field of the incoming data packet.

The field of the incoming packet can be used additionally to the storage cell of the forwarding unit for reading a parameter value for the generation of the response packet.

According to a further embodiment of the disclosure, the configuration module is configured to generate the configuration command such that it comprises an outgoing port of the forwarding unit for transmitting the generated response packet.

The outgoing port is used by the forwarding unit for transmitting the response packet. By identifying the outgoing port the target and/or the route of the response packet through the SDN can be affected. The response packet can be sent to the requesting entity or it can be sent to a group of entities or any other specific third entity, for example to inform the third entity about incoming of a specific data packet at the forwarding unit. When referring to an entity or a client, this relates to a device which is connected to the SDN.

According to a further embodiment of the disclosure, the configuration module is configured to generate the configuration command such that it comprises a response packet template for generating the response packet at the forwarding unit.

The response packet template is stored in the storage module of the forwarding unit. When generating the response packet, the template is read out first and subsequently padded with parameter values pointed to by the response rule, for example parameter values from the storage module or from the incoming data packets.

The response packet template can comprise several predefined fields with predetermined unchanging and static values such that the number of fields of the response packet to be filled with parameter values from the storage module is low and the required computational power on the forwarding unit is minimal.

The control unit described herein may expose a north bound interface to the application and/or users to be able to specify the packet that is to be sent out in case of a specific match. The control unit is able to populate the template and replacement memory storage corresponding to any supported forwarding unit as described above with packet templates as well as the corresponding replacement strings, may further be able to precisely specify to the forwarding unit, which memory string/buffer is to be used as a packet template in case of a specific match, i.e., normally as part of a flow rule definition, may further be able to specify what part(s) of the constructed packet template need to be replaced by which element for the forwarding unit environment and/or the replacement strings.

An interface may be provided which enables configuration of the forwarding unit by the control unit.

A standardized interface between the forwarding unit and the control unit can be provided that offloads all standardized tasks from the control unit to the forwarding unit and that the applications running on top of the control unit, or the control unit itself, can use to configure relatively static replies into the SDN enabled forwarding unit in the network.

The interface is essentially the ability of a control unit to specify an action for a forwarding unit that tells the forwarding unit in case of a match to: a) construct a packet from a memory buffer specified by the controller; b) replace from zero to possibly multiple substrings of the buffer with substrings from various data sources as specified by the control unit, where the sources include, but are not limited to, system memory of the switch, the packet that matched and its context, the supplied controller information, a replacement database and/or metering or performance values of the switch; and c) send out the constructed packet to any output port of the forwarding unit including the same output port as the input port the original matching packet as defined by the action in the response rule.

According to a further aspect of the disclosure, a software defined network (SDN) system is provided. The SDN system comprises at least one control unit and at least one forwarding unit as described above, wherein the at least one control unit is configured to configure at least one response rule of the at least one forwarding unit.

Specifically, the control unit is a control unit as described in more detail above.

According to a further aspect of the disclosure, a method for configuring a forwarding unit of a software defined networking (SDN) system by a control unit is provided. The method comprises the steps of: generating a configuration command by the control unit, wherein the configuration command comprises a response rule with a matching condition of an incoming data packet at the forwarding unit, at least one parameter value to be stored in a storage module of the forwarding unit; instructing the forwarding unit to generate a response packet if an incoming data packet matches the response rule, wherein the response packet is to be generated based on the at least one parameter value; and transmitting the configuration command to the forwarding unit.

According to an embodiment of the disclosure, the configuration command comprises a location in the storage module for storing the at least one parameter value, such that the response packet is to be generated by the forwarding unit based on the location of the at least one parameter value in the storage module.

According to a further aspect of the disclosure, a method for generating a response packet by a forwarding unit of a software defined network (SDN) system is provided. The method comprises the steps of: analyzing incoming data packets in view of at least one response rule of the forwarding unit; generating a response packet according to the response rule in case of a response rule match; wherein the step of generating the response packet comprises: generating the response packet based on storage content stored at at least one predefined storage location in the storage module, wherein the at least one storage location is identified in the response rule.

As mentioned above with reference to the forwarding unit, this entity operates autonomously relating to the generation of the response packet once it has been configured.

According to an embodiment of the disclosure, the step of generating the response packet comprises: generating the response packet according to a predefined response packet template, wherein the response packet template comprises at least one static field and at least one dynamic field, wherein the dynamic field is generated based on content of a storage cell identified in the response rule.

The method of this aspect may further comprise the following steps: the step of generating the response packet comprises generating the response packet based on fields of the data packet, which data packet matches the response rule, wherein the fields are identified in the response rule.

In other words, an incoming packet is analyzed by the forwarding unit and the values of at least one of the incoming packet's fields are used for generating the response packet.

The forwarding unit and the control unit may, in summary, be described as follows:

A forwarding switch is configured such that it can send out a string/buffer held in some memory/store as an action in response to a match, as directed by the controller. The forwarding unit may log and report to the controller the number and the event occurrence of such packets sent out.

The forwarding unit can then install the required information based on the controller's direction to substitute variables into memory, which it may send out as a response to a matched packet/flow. The information may be installed by the controller. The forwarding unit may request the controller to install such information.

A controller to forwarding unit interface can provide the memory string to send as a packet, where the memory string can consist of variables that can be replaced by the forwarding unit from its own database which may or may not be populated by the controller, from the packet to which it is responding and its metadata/context, or from the information that is available in its local environment/kernel as directed by the controller.

A controller to forwarding unit interface can be provided which enables installing the values of variables to the memory in the forwarding unit. For example, the forwarding unit may be configured to recognize a request for a printer's address in the network (match-section of the response rule), wherein the response rule instructs the forwarding unit to generate a respective response packet which is addressed to the requesting device.

Herein, an approach to offload controller from simple and repetitive tasks, such as those originating from basic communications and static configurations within the network for which no dynamic complex decisions are required. For example: in the Simple Service Discovery Protocol (SSDP), a search for printers is a broadcast request that is normally flooded through the network. When a compliant printer receives it, it can respond with a unicast message declaring its presence. The nature of such response is static, meaning that the packet content (the application data, beside the header of the response packet) is essentially the same for any entity searching for printers. This disclosure proposes an SDN interface, such that the controller can enable all switches in the network to reply directly to such a search request, creating no additional traffic within the control plane. Another example is the denial of access to certain mobile hosts that can be configured as a static policy in the edge switches of the network by the controller. In this way, protection against denial of service attacks may be realized without any effect on the network.

When such static configurations are known (or can be detected) a-priori, and a precise match field can be created for them, then any other entity could represent the controller and directly treat (e.g. reply to) these packets, including the first SDN-capable switch receiving the packet. The main idea presented here is to offload such static process from the controller to the edge switches by enabling an interface for the controller to express such actions. Application-defined-protocol specific behavior can be dynamically simulated. This enables achieving network protocol independence, wherein each application can define its own protocol behavior.

BRIEF DESCRIPTION OF THE FIGURES

Embodiments of the disclosure will be described with respect to the following figures, in which.

DETAILED DESCRIPTION OF EMBODIMENTS

Figure 1:
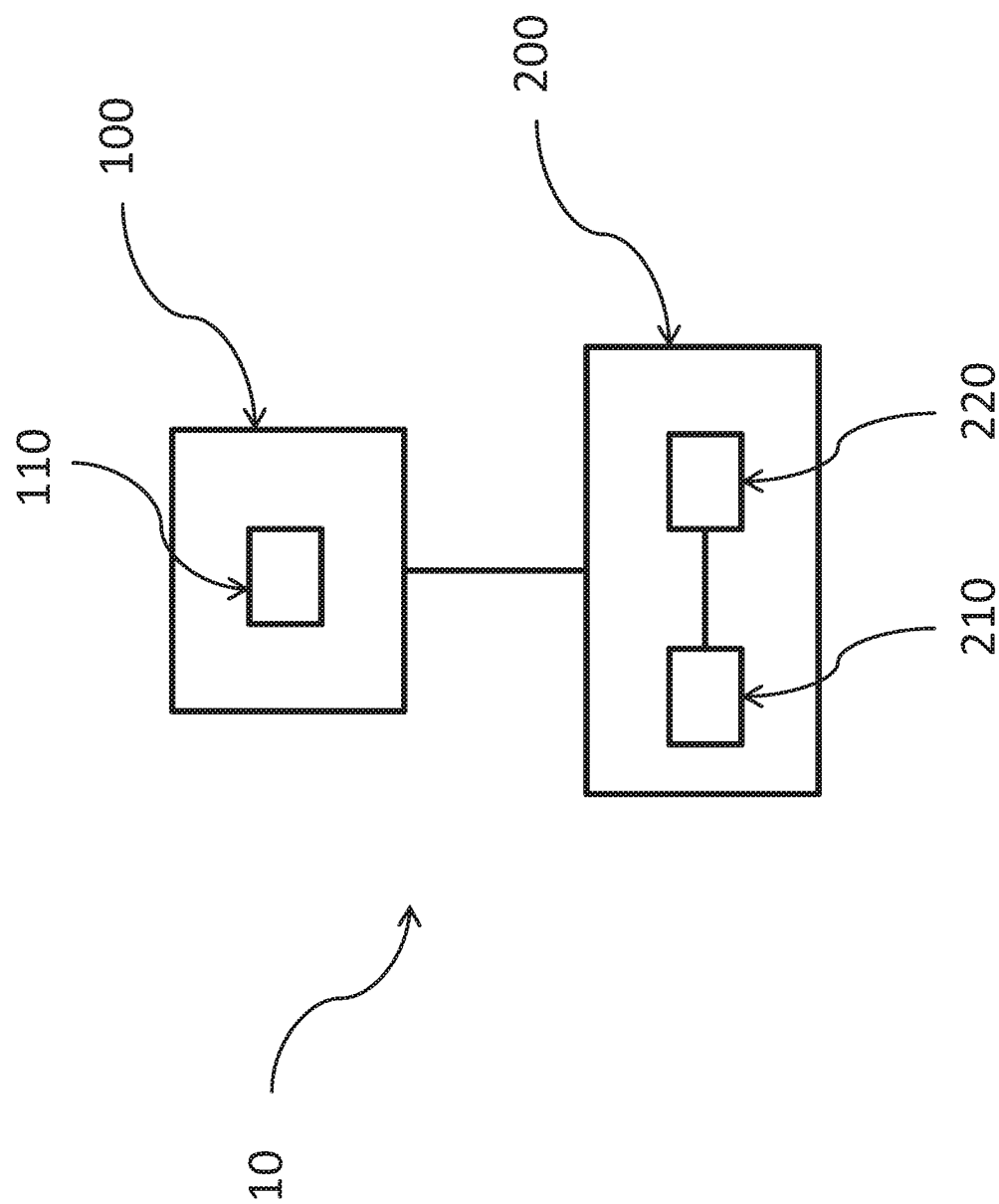
FIG. 1 schematically shows an SDN system according to an exemplary embodiment of the disclosure.

FIG. 1 provides an overview of the structure of an SDN system 10. The control plane 100 is separated from the data plane 200. The control plane 100 is formed by at least one control unit 110 which controls the configuration and the functioning of the data plane, in particular the configuration of forwarding rules on the forwarding unit 210, 220 of the data plane.

The SDN system 10 and its components are configured to carry out the functions as described above with reference to the method for configuring forwarding rules for data packet transmission in a software defined network (SDN) system, and further with reference to the forwarding unit and control unit.

Figure 2:
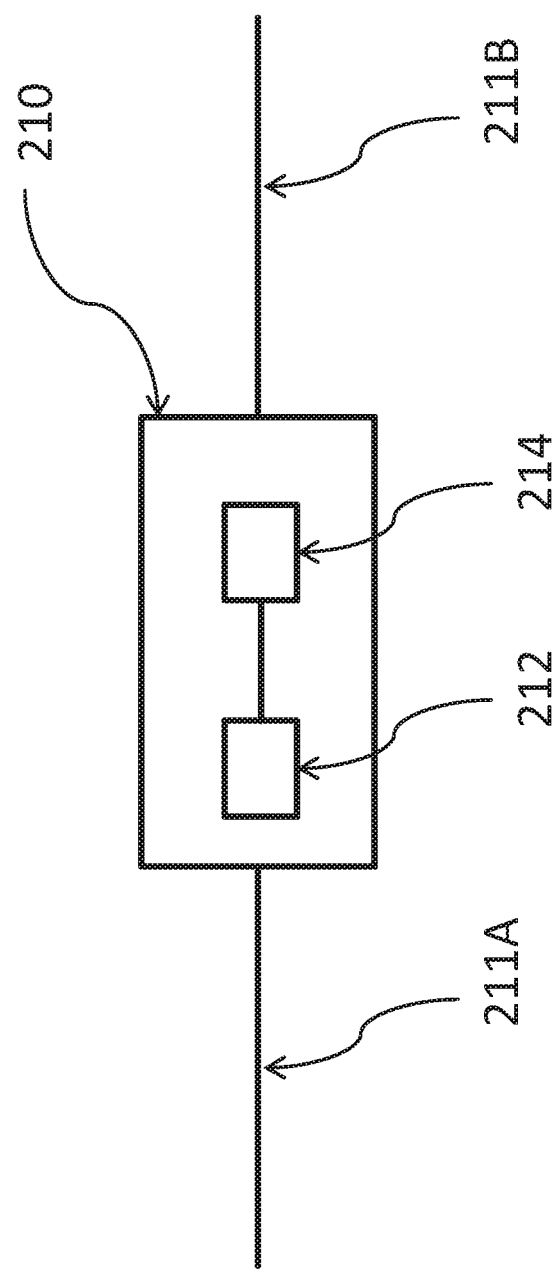
FIG. 2 schematically shows a forwarding unit according to an exemplary embodiment of the disclosure.

FIG. 2 shows a forwarding unit 210 comprising a first port 211A, a second port 211B, a storage module 212 and a response packet generating module 214.

The first port may be an incoming port (receiving data packets) and the second port may be an outgoing port (transmitting outgoing data). The forwarding unit may comprise more than two ports and any one of these ports can be configured to receive and transmit data packets. A forwarding rule may be configured to determine the outgoing port for any received data packet thus defining the route of the data packet through the data plane. The response packet generating module 214 is configured to generate response packets if an incoming packet meets the criteria of one response rule (response rule match) and to send the response rule via one of the ports 211A, 211B to a device in the SDN system.

Figure 3:
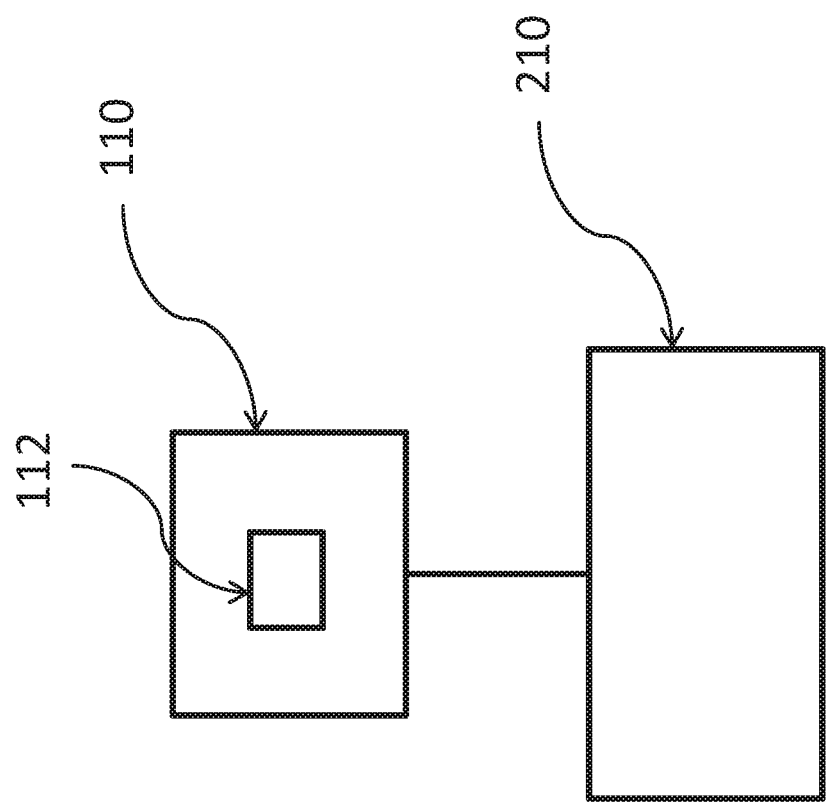
FIG. 3 schematically shows a control unit and a forwarding unit according to an exemplary embodiment of the disclosure.

FIG. 3 illustrates the relation between a control unit 100 which comprises a configuration module 112 and a forwarding unit 210. The control unit is configured to send configuration commands to the forwarding unit 210, wherein the configuration commands define the data packet forwarding function and the response packet generating function of the forwarding unit as described above and hereinafter. The configuration module 112 is configured to generate the flow rules and the response rules.

Figure 4:
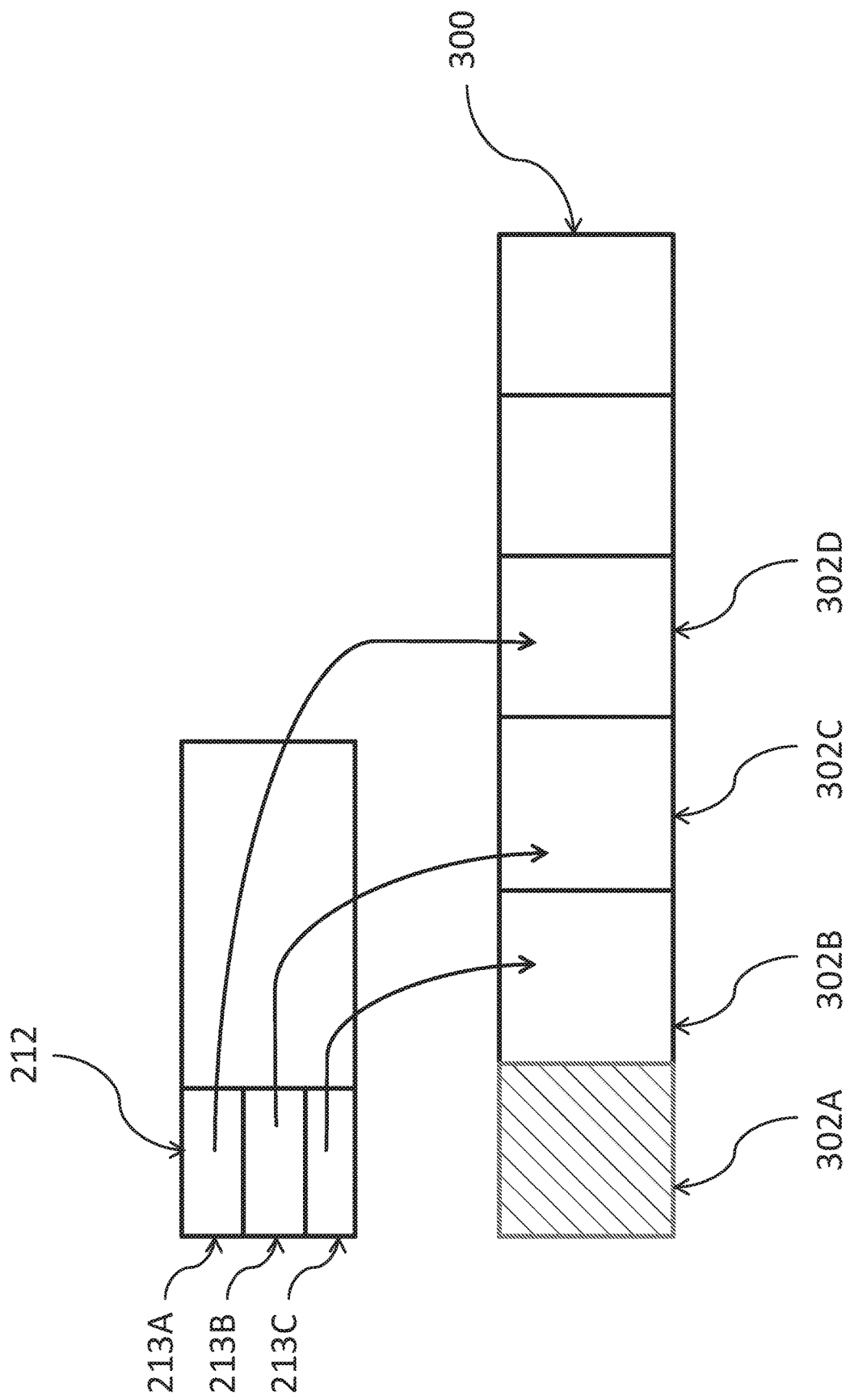
FIG. 4 schematically shows the generation of a response packet by a forwarding unit according to an exemplary embodiment of the disclosure.

FIG. 4 schematically shows the generation process of a response packet. The storage module 212 contains multiple cells 213A, 213B, 213C which contain any predefined content or parameter values. The response rule defines which content to use for generating the response packet 300.

The response packet 300 comprises several fields 302 (header and user data, not specifically distinguished in FIG. 4 as this does not have any impact on the packet generation process). One of these fields, namely the first field 302A which is hatched, contains a static content (e.g., some flags or the address of the originating device of the forwarding unit which is generating the response packet) which is defined by the response packet template. Thus, the first field does not have to be filled with content from the storage module. The second field 302B is filled by copying the content from the third cell 213C, the third field 302C by copying the content from the second cell 213B, and the first field by copying the content from the first cell 213A. The remaining fields of the response packet can be generated based on other cells of the storage module 212 or based on the matching packet, for example.

Figure 5:
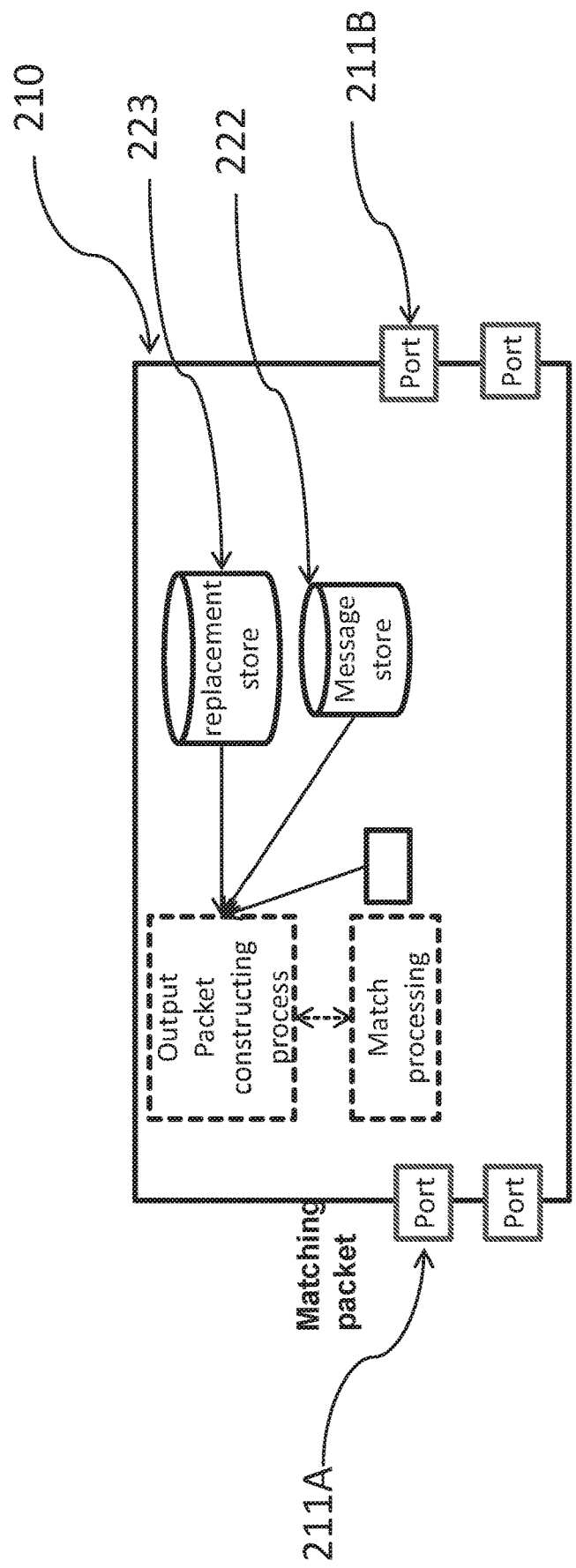
FIG. 5 shows a functional overview of a forwarding unit according to an exemplary embodiment of the disclosure.

FIG. 5 shows a forwarding unit 210, where the match processing and the response packet generation (output packet constructing process) are functionally separated. These tasks may be performed by a processing unit (not structurally shown) of the forwarding unit 210. The matching and constructing process are initiated when a packet is received by the forwarding unit 210 at the incoming port 211A.

A message template store database 222 which may be part of a storage unit of the forwarding unit stores message templates that the control unit provides to the forwarding unit with corresponding response rule or configuration messages. A replacement store database 223 consists of replacement strings, pointers to other replacement sources and other relevant information provided by the control unit. The output packet constructing process in which, when a respective flow rule is matched, a new message (response packet) is built from the message store 222 and then appropriate replacements are applied at the right locations as specified by the response rule from the replacement database 223 and/or system memory of the switch, the packet that matched and its context/metadata, the controller information, and or metering or performance values of the forwarding unit. The generated response packet is sent by the forwarding unit as defined by the response rule.

Figure 6:
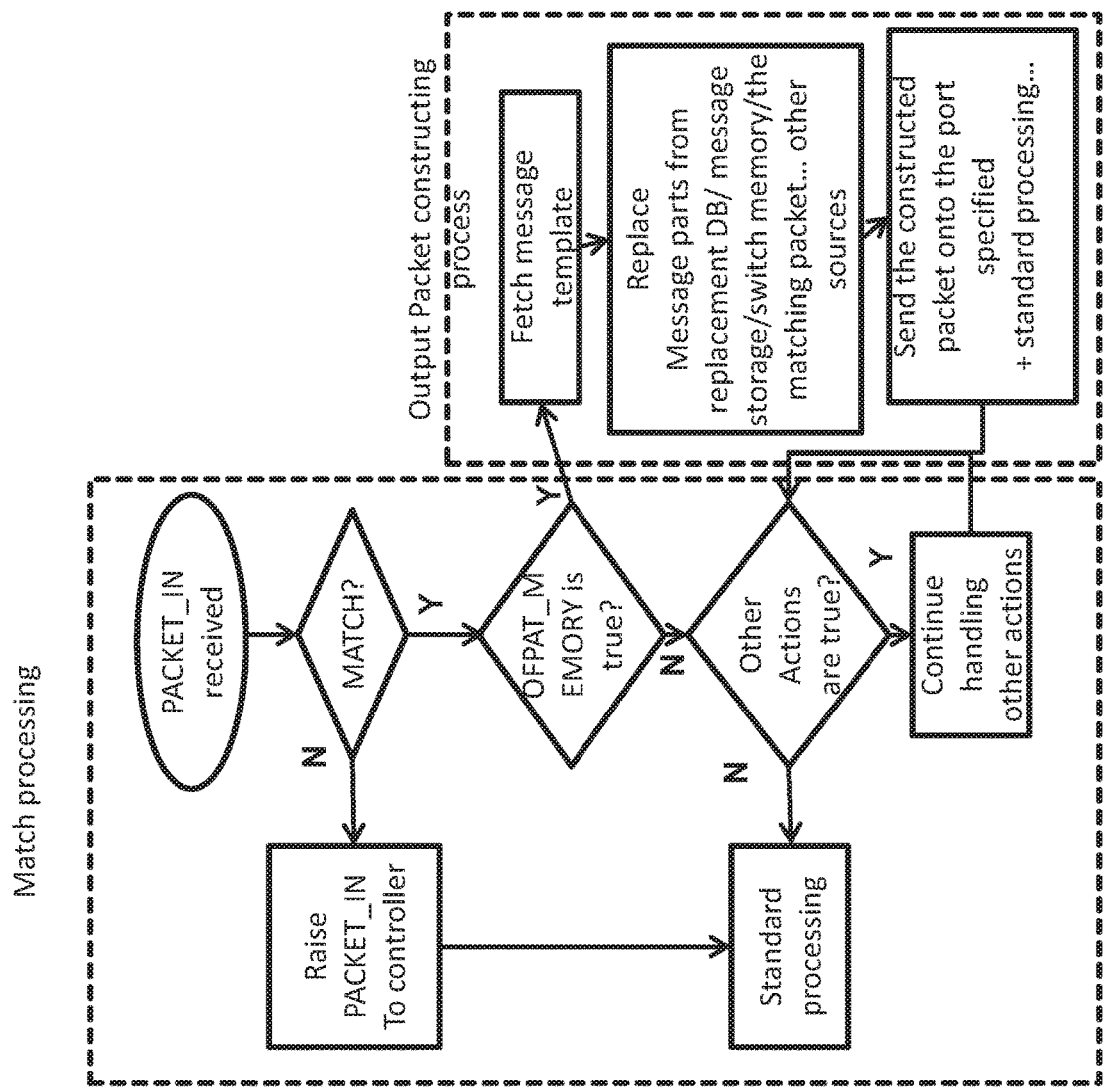
FIG. 6 shows an overview of the response packet generating process by a forwarding unit according to an exemplary embodiment of the disclosure.

FIG. 6 shows a flowchart of the match processing and response packet generation. The response packet generation may also be part of the match processing. The steps are described with reference to FIG. 5 and not repeated here.

Figure 7:
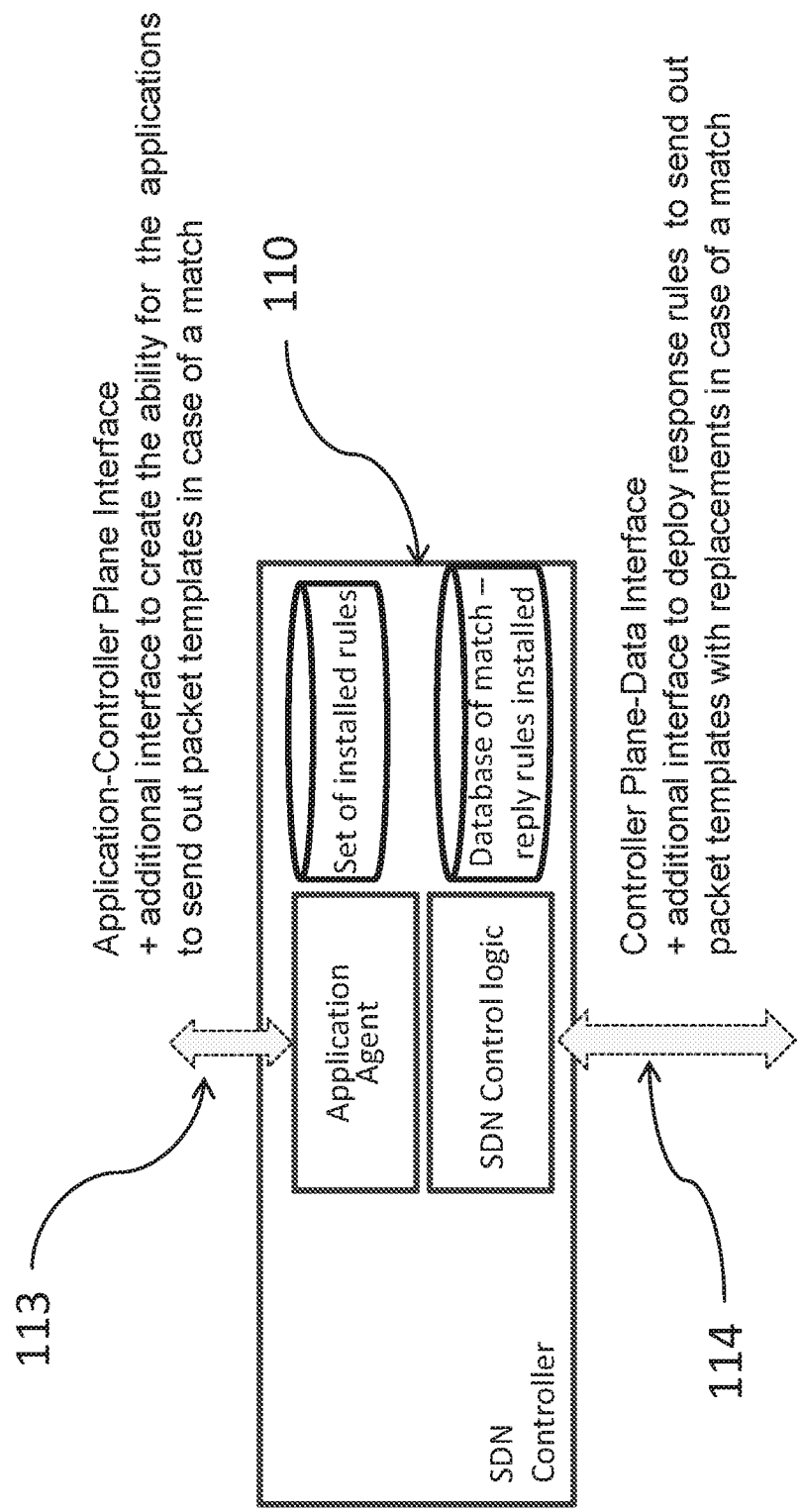
FIG. 7 shows a control unit according to an exemplary embodiment of the disclosure.

FIG. 7 shows a control unit 110. In addition to the standard set of installed rules the control unit 110 may keep a list of forwarding unit, on which the match-reply rules (response rules) were installed. Further, the control unit exposes an interface 113 to the applications that enables them to install the match-reply rules on a given set of forwarding units in the network. In addition, the controller can use the interface 114 exposed by the forwarding units as described above for configuring the forwarding units to generate response packets.

In the following, a further example of a configuration process of the control unit configuring the forwarding unit is provided.

For a specific embodiment of the control unit to forwarding unit interface, the de facto SDN standard for controller to switch interface OpenFlow can be taken. The general idea of the embodiment for OpenFlow is to define a system using a controller that can specify when and what a switch has to forward/send on (when there is a match) by:

a) defining a new action type for an OF flow rule that results in directly sending a new packet in case of a match. This requires the construction of a packet from a template, this packet is then to be sent out on match; for this embodiment it is refer to this as MEMORY_OUT OpenFlow action type;

b) defining a switch-controller interaction on how to send templates to the switch; for this embodiment the action PACKET_OUT( ) is extended with the action type MEMORY_OUT. In that case the packet contained in the packet_out is stored in a packet template memory in the switch to be sent out at a later stage when a match occurs. This match is defined by the FLOW_MOD message (next point);

c) defining how the switch can store this message waiting for a possible match or other usage; allow new action MEMORY_OUT in FLOW_MOD OF message with new supporting data structures to enable referencing the memory template of step a) as well as the replacements of step d);

d) defining how to use a stored output packet as a template for different incoming packets. This is called "replacement" in the following description.

The interface needs to be changed to support the action of a switch sending a packet out on the network in response to a match as specified by the controller. To do so the controller needs to be able to specify a new type of action 'OFPAT_MEMORY'.

This achieves the current interface specifying that a memory buffer needs to be sent out as a packet when the match happens. However, to support this action, the real set of bytes that are actually to be sent out may be specified. In this embodiment, the contents of each action corresponding to OFPAT_MEMORY action type are held. The content points to a memory_id location as present in the used memory data structure. A list of such memory locations and buffers may be stored in the switch in an appropriate structure in a database. This database maybe populated by the controller using a PACKET_OUT or a FLOW_MOD with the action specified as OFPAT_MEMORY. The of_action_memory data structure may further comprise: i) the replacement_id array containing the id of replacements; ii) an array of offsets into that memory structure with the indices matching the replacement_ids and iii) the size of the replacement string to be copied over to the packet template. In this way an overall embodiment to enable the controller to tell the switch to be able to reply with specific packets when a match occurs can be enabled. The replacement structure can store a type of the replacement memory, based on which the correct item in the replacement type must be initialized. A database of such replacements may be stored in the switch which can be populated by the controller using a specific interface to do the same. Lastly, other auxiliary commands that the controller may invoke on the switch may be executed. The add_to_replacements command may add newer values to the replacement database. The "get_list_of_replacements" interface can provide the controller with the entire or part of the database of the switch. Lastly, the add/modify memory command may be an alternative to PACKET_OUT explained above for replacing or modifying memory templates stored with the switch.

Figure 8:
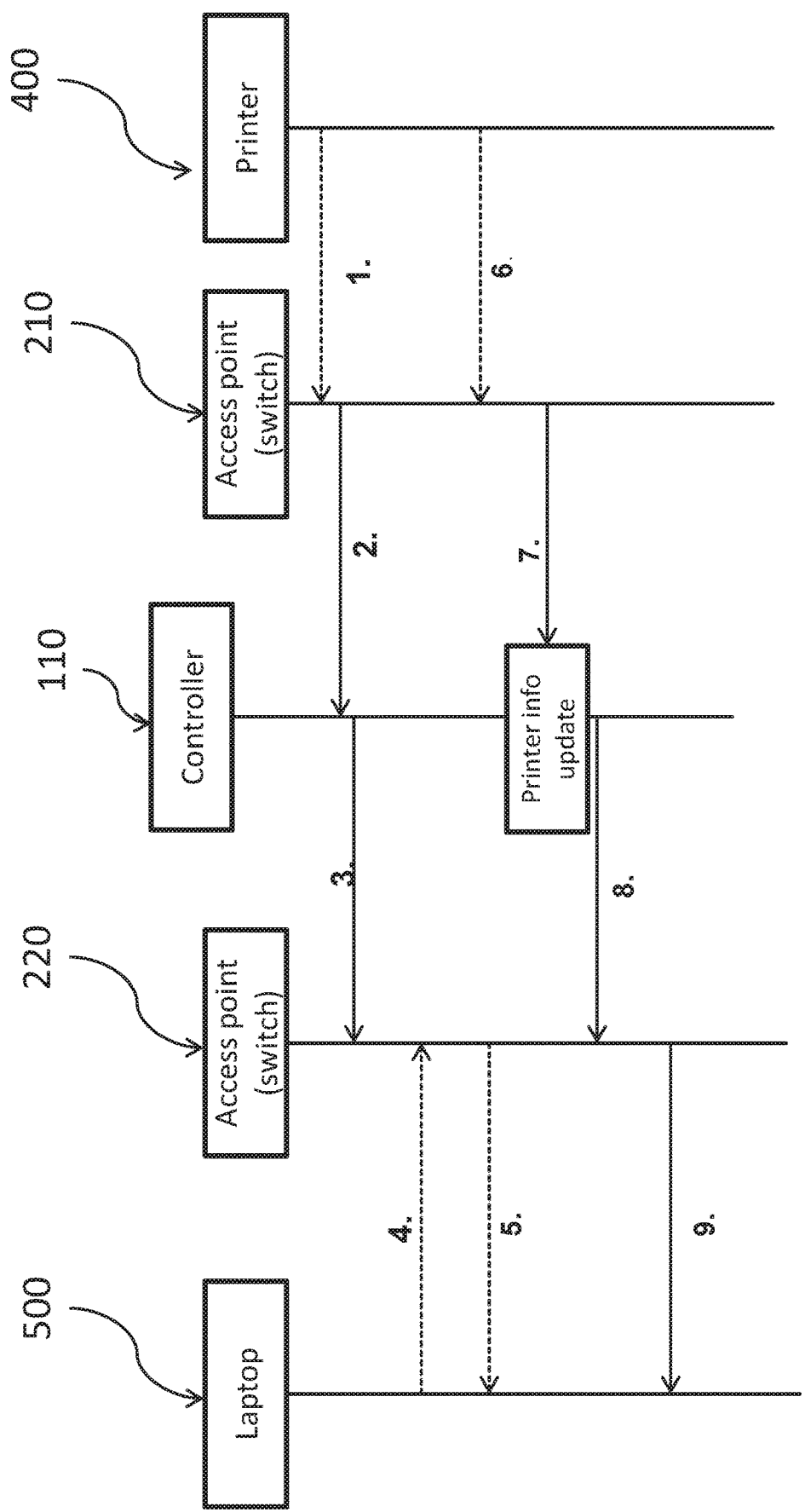
FIG. 8 schematically shows the packet flow of a use case in a SDN system according to an exemplary embodiment of the disclosure.

FIG. 8 shows the message flow between SDN components (forwarding units 210, control unit 110) and devices connected to an SDN system (printer 400, user device 500, for example a laptop) when using forwarding unit which are configured to autonomously generate a response packet.

The printer 400 when enabled sends an M-Notify multicast request to the network (step 1) wherein the request is firstly received by a first switch 210 and forwarded to the controller 110, if the forwarding unit does not have a matching rule. The first switch 210 (or access point, network element) that is SDN-enabled that sees this message, has no existing rules to handle it. It therefore forwards the message to the controller 110 as a PACKET_IN (step 2). In step 3, the controller 110 (or an application running on top of the controller via the controller) instructs all other switches of the SDN system to send out the same packet when for instance, the switch sees a packet to 239.255.255.250:1900 with a search string set to search for a printer (equivalent to the ST string in the M-Notify (step 1) from the printer or with ST set to "all"), and the sender address is different from that of the printer. The switches may match the ST string for example by using solutions like protocol oblivious forwarding (POF) or deep packet inspection (DPI). In step 4, when in one such switch, where the match-reply rule of step 3 was installed, a device (e.g., laptop 500) appears searching for printers sending the M-Search packet. On match, the second switch 220 replies directly with the M-Notify packet (step 5) that it just received from the controller 110, and therefore no network resources are used in the control plane, and the reply is, essentially, immediate. The laptop 500 then thinks it just received a broadcast advertisement from a printer and can contact it directly with the appropriate messages. In this embodiment a new, independent advertisement from the printer can be sent, which has the advantage to exhibit a static nature, i.e., it is independent of the recipient laptops/devices. Steps 6-9 show that the printer 400 may periodically send updates.

In one embodiment, the Simple Service Discovery Protocol (SSDP) may be used as part of the universal plug and play (UPnP) suite in networks to advertise and detect services and devices.

As in the embodiment of FIG. 8, no replacements of field values in the packet of the printer are taken, and this embodiment can be referred to as a use case without replacement.

Figure 10:
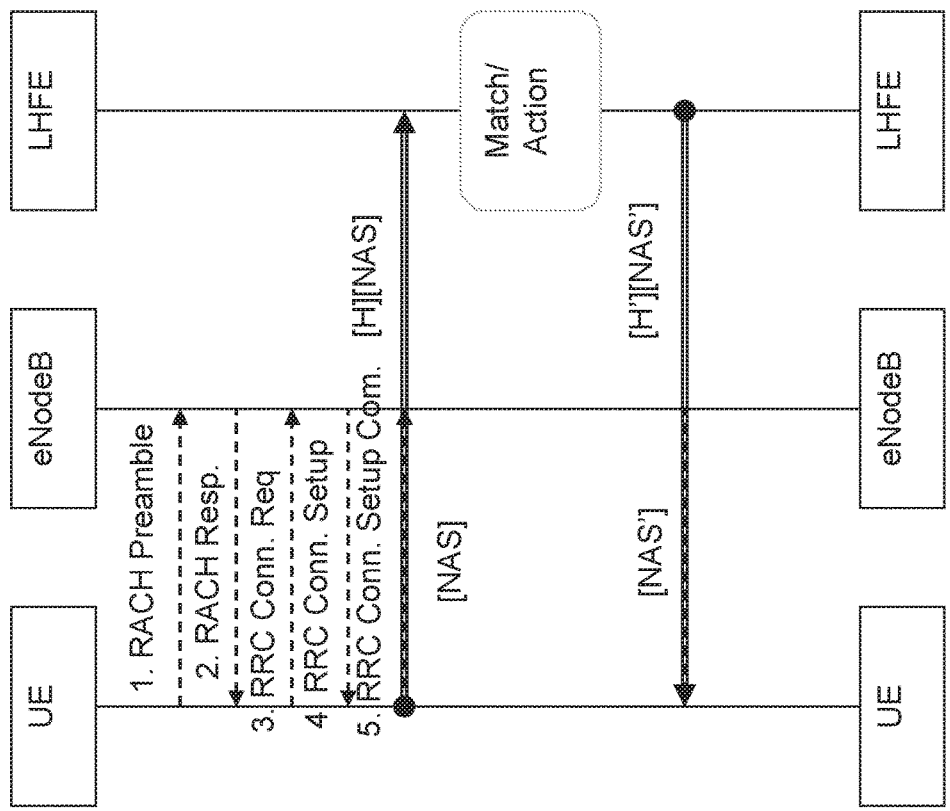
FIG. 10 schematically shows the control plane signalling of an LTE control plane connected to an SDN system according to an exemplary embodiment of the disclosure.
Figure 9:
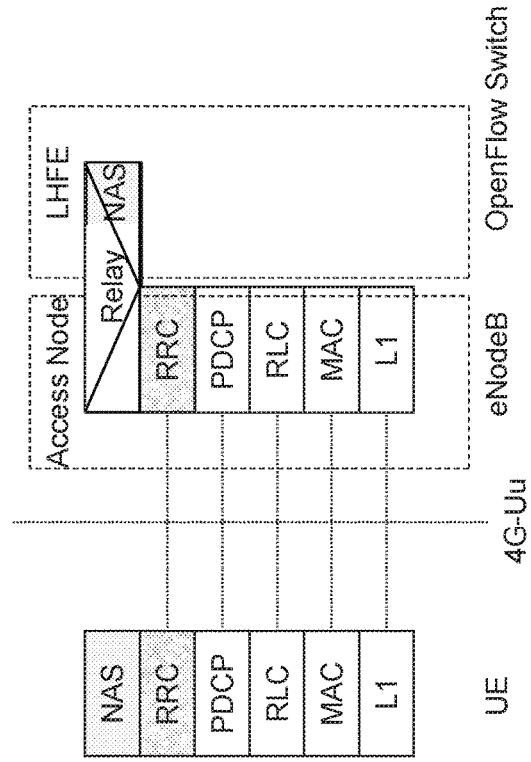
FIG. 9 schematically shows connection of an LTE eNodeB to a forwarding unit according to an exemplary embodiment of the disclosure.

FIGS. 9 and 10 show an example embodiment as applied to a use case with replacement.

The backhaul and core of a telecommunication access network (such as eNodeB for mobile networks or WiFi access points) may be implemented by an SDN network. For instance, in FIG. 9 an LTE (long term evolution) eNodeB (evolved node B) is connected to an OpenFlow switch, hereby referred as Last Hop Forwarding Element (LHFE), intended as the entry point of an SDN-based backhaul.

FIG. 10 shows an example of LTE Control Plane signaling related to a Non Access Stratum (NAS) procedure originated by a User Equipment (UE), e.g., to perform a initial attachment. The LHFE receives a NAS message [NAS] from the eNodeB that is to be forwarded to the appropriate Control Plane function (e.g., the connectivity management in the Mobility Management Entity (MME)) according to the content of the Header [H].

In this embodiment, in some cases pre-defined by the SDN controller, the LHFE does not forward the NAS message and it generates autonomously a response [NAS']. The response [NAS'] is a memory stored in the LHRE including variables that will be populated based on the content of [H] and [NAS].

The content of [H] may be, for example: radio resource control (RRC) establishment cause, UE identifier used in the RRC connection setup, public land mobile network ID (PLMNid), Access Node ID.

The content of [NAS], in case of UE originated initial attachment, may be: ENB-UE-S1AP-ID (unique UE identifier within the access node), TAI (Tracking Area Code), EUTRAN-CGI (Cell global Identity), RRC-establishment-cause, EPS (evolved packet system) attach type, EPS mobile identity, PDN (packet data network) type, Access Point Name.

For example, if the [NAS] message carries an initial attachment for a type of device or connection request that the core network cannot serve, the response [NAS'] could be an attach reject. This can apply to the following Denial of Service use cases: the addressed core functional entity cannot serve the requested attach type; the UE identifier is not recognized as valid for the requested core functional entity; or the device requires connecting to a PDN or Access Point Name that are not recognized are valid by the core network.

What is claimed is:

1. A forwarding device for use in a software defined networking (SDN) system, wherein the forwarding device comprises:
a memory configured to store at least one response rule, wherein the response rule defines how to generate, by the forwarding device, a response packet responsive to a standardized request included in a received packet, wherein static configurations of the standardized request are known or can be detected by the forwarding device; and
a processor coupled to the memory and configured to generate the response packet according to a predefined response packet template corresponding to the response rule in case of a response rule match and based on information which is identified in the at least one response rule, wherein the predefined response packet template comprises at least one static field and at least one dynamic field,
wherein the memory is further configured to,
store first content of the at least one static field at a first location; and
store second content of the at least one dynamic field at a second location, wherein the response rule identifies the first location and the second location, wherein the response packet comprises a first dynamic field generated based on the second content of the second location identified in lie response rule.

2. The forwarding device of claim 1, wherein the at least one response rule identifies a location in the memory that stores information for generating the response packet, and wherein the processor is further configured to read the information stored in the location.

3. The forwarding device of claim 1, further comprising two ports, wherein the forwarding device is configured to:
transmit the response packet via one port of the two ports according to the response rule; and
transmit the response packet via that port at which the data packet that matches the response rule is received.

4. A control device for use in a software defined networking (SDN) system and for controlling at least one forwarding device within the SDN system, wherein the control device comprises:
a memory; and
a processor coupled to the memory and configured to generate a configuration command for a forwarding device, wherein the configuration command comprises a response rule with a matching condition for an incoming data packet at the forwarding device, wherein the response rule is associated with at least one parameter value to be stored in a memory of the forwarding device, wherein the response rule defines how to generate, by the forwarding device, a response packet according to a predefined response packet template corresponding to the response rule responsive to a standardized request included in the incoming data packet, wherein the predefined response packet template comprises at least one static field and at least one dynamic field, wherein the response rule identifies a first location to store the at least one static field and a second location to store the at least one dynamic field, wherein the response packet comprises a first dynamic field generated based on the second content of the second location identified in the response rule, wherein static configurations of the standardized request are known or can be detected by the forwarding device, wherein the configuration command is configured to instruct the forwarding device to generate the response packet when the incoming data packet matches the response rule, and wherein the response packet is to be generated based on the at least one parameter value.

5. The control device of claim 4, wherein the configuration command comprises a location in the memory for storing the at least one parameter value, and wherein the response packet generating command identifies the location such that the response packet is generated based on the location of the at least one parameter value in the memory.

6. The control device of claim 4, wherein the control device is further configured to generate the configuration command such that it comprises a pointer to a field of the incoming data packet that matches the response rule, and wherein the response packet is to be generated based on the parameter stored in the field of the incoming data packet.

7. The control device of claim 4, wherein the control device is further configured to generate the configuration command such that the configuration command comprises an outgoing port of the forwarding device for transmitting the response packet.

8. The control device of claim 4, wherein the control device is further configured to generate the configuration command such that the configuration command comprises a response packet template for generating the response packet at the forwarding device.

9. A method for configuring a forwarding device in a software defined networking (SDN) system and implemented by a control device, the method comprising:
generating a configuration command comprising a response rule with a matching condition for an incoming data packet at the forwarding device, wherein the response rule is associated with at least one parameter value to be stored in a memory of the forwarding device wherein the response rule defines how to generate, by the forwarding device, a response packet according to a predefined response packet template corresponding to the response rule responsive to a standardized request included in the incoming data packet, wherein the predefined response packet template comprises at least one static field and at least one dynamic field, wherein the response rule identifies a first location to store the at least one static field and a second location to store the at least one dynamic field, wherein the response packet comprises a first dynamic field generated based on the second content of the second location identified in the response rule, and wherein static configurations of the standardized request are known or can be detected by the forwarding device; and
instructing the forwarding device to generate, based on the at least one parameter value, the response packet when the incoming data packet matches the response rule by transmitting the configuration command to the forwarding device.

10. The method of claim 9, wherein the configuration command comprises a location in the memory for storing the at least one parameter value such that the response packet is to be generated by the forwarding device based on the location of the at least one parameter value in the memory.

11. The method of claim 9, wherein the configuration command further comprises a pointer to a field of the incoming data packet that matches the response rule, and wherein the response packet is to be generated based on the parameter stored in the field of the incoming data packet.

12. The method of claim 9, wherein the configuration command further comprises an outgoing port of the forwarding device for transmitting the response packet.

13. The method of claim 9, wherein the configuration command further comprises a response packet template for generating the response packet at the forwarding device.

14. The method of claim 9, wherein the response packet is a new packet.

15. The method of claim 9, wherein the incoming data packet is from a printer.

16. The forwarding device of claim 1, wherein the received packet is from a printer, and wherein the static configurations of the standardized request are known by the forwarding device.

17. The forwarding device of claim 1, wherein the response packet is a new packet.

18. The control device of claim 4, wherein the response packet is a new packet.

* * * * *